(12) United States Patent
Hiepp et al.

(10) Patent No.: US 12,440,922 B2
(45) Date of Patent: Oct. 14, 2025

(54) MACHINE TOOL HAVING CABLE GUIDE APPARATUS

(71) Applicant: DMG MORI Ultrasonic Lasertec GmbH, Stipshausen (DE)

(72) Inventors: Ludwig Hiepp, Betzigau (DE); Andreas Abt, Oy-Mittelberg (DE)

(73) Assignee: DMG MORI Ultrasonic Lasertec GmbH, Stipshausen (DE)

( * ) Notice: Subject to any disclaimer, the term of this patent is extended or adjusted under 35 U.S.C. 154(b) by 582 days.

(21) Appl. No.: 17/918,953

(22) PCT Filed: Apr. 22, 2021

(86) PCT No.: PCT/EP2021/060505
§ 371 (c)(1),
(2) Date: Oct. 14, 2022

(87) PCT Pub. No.: WO2021/219483
PCT Pub. Date: Nov. 4, 2021

(65) Prior Publication Data
US 2023/0234165 A1    Jul. 27, 2023

(30) Foreign Application Priority Data
Apr. 30, 2020    (DE) ............... 10 2020 205 565.3

(51) Int. Cl.
*B23K 26/14*    (2014.01)
*B23K 26/08*    (2014.01)
(Continued)

(52) U.S. Cl.
CPC ........ *B23K 26/147* (2013.01); *B23K 26/0884* (2013.01); *B23K 26/342* (2015.10);
(Continued)

(58) Field of Classification Search
CPC .......... B22F 10/20; B22F 10/25; B22F 12/50; B23K 26/0884; B23K 26/147;
(Continued)

(56) References Cited

U.S. PATENT DOCUMENTS 5,961,156 A    10/1999    Furuhashi
9,834,415 B2 *  12/2017    Hense ................ B66B 19/00
(Continued)

FOREIGN PATENT DOCUMENTS

CN        2597171 Y  *  1/2004
CN      204449532 U      7/2015
DE  20 2019 102323 U1    5/2019

OTHER PUBLICATIONS

Office Action dated Mar. 28, 2025 for CN App. Ser. No. 202180031972.5, with English language summary.
International Search Report dated Sep. 14, 2021 for PCT App. Ser. No. PCT/EP2021/060505.
Examination Report dated Feb. 17, 2021 for German App. Ser. No. 10 2020 205 565.3 with English translation.

*Primary Examiner* — Hung D Nguyen
(74) *Attorney, Agent, or Firm* — Henricks Slavin LLP

(57) ABSTRACT

A cable guide apparatus including a guide apparatus, a slide movably guided in the guide apparatus, a deflection roller connected to the slide, a first tension weight, a cable pull apparatus which connects the first tension weight to the slide guided in the guide apparatus, wherein the connection cable has a free end and a fixed end connected to a connection apparatus and extends over the deflection roller, a second tension weight and a second guide apparatus in which the tension weights are each movably guided, such that the connection cable extending over the deflection roller is preloaded in a first displacement region of the free end by a force generated by the weight force of the first tension weight and is preloaded in a second displacement region of the free end by a force generated by a total of the weight forces of the tension weights.

20 Claims, 6 Drawing Sheets

(51) Int. Cl.
    *B23K 26/342*     (2014.01)
    *B23Q 1/40*     (2006.01)
    *B65H 75/36*     (2006.01)
    *B33Y 10/00*     (2015.01)
    *B33Y 30/00*     (2015.01)

(52) U.S. Cl.
    CPC .............. *B23Q 1/40* (2013.01); *B65H 75/368* (2013.01); *B33Y 10/00* (2014.12); *B33Y 30/00* (2014.12); *B65H 2701/341* (2013.01)

(58) Field of Classification Search
    CPC ................ B23K 26/342; B65H 75/368; B65H 2701/34; B65H 2701/341; B23Q 1/40; B23Q 1/48; B23Q 1/52; Y02P 10/25; B33Y 10/00; B33Y 20/00
    See application file for complete search history.

(56) References Cited

U.S. PATENT DOCUMENTS

| | | | |
|---|---|---|---|
| 2002/0121578 A1* | 9/2002 | Metelski | G02B 7/001 248/125.2 |
| 2007/0056809 A1* | 3/2007 | Fernandes | B66B 11/0246 187/401 |
| 2011/0272223 A1* | 11/2011 | Drayer | B66B 5/044 188/65.1 |
| 2012/0037274 A1 | 2/2012 | Henderson | |
| 2013/0105250 A1* | 5/2013 | Meierhans | B66B 5/046 187/350 |

* cited by examiner

MACHINE TOOL HAVING CABLE GUIDE APPARATUS

TECHNICAL FIELD

The present invention relates to a machine tool including a cable guide apparatus for a connection cable of a cable-connected tool and a cable guide apparatus for guiding a flexible connection cable.

BACKGROUND OF THE INVENTION

Numerically controlled machine tools which use one or more controllable machine axes to position a tool and a workpiece to be machined with respect to one another are known from the prior art, wherein the tool may be a cable-connected tool that is supplied with materials essential for machining via a connection cable and/or is connected to an external energy supply via the connection cable.

In the case of more complex machining centers, such a cable-connected tool usually only represents one of the tools available to the machine tool, which is why the supply via the connection cable usually is not carried out via permanently installed, rigidly designed supply lines but via the connection cable directly connected to the tool, said connection cable often also being referred to as a trailing cable in this context.

Such connection cables are generally configured to be flexible and have corresponding length and freedom of movement in order to track the movements of the cable-connected tool controlled by the machine tool during a machining process.

However, such long connection cables may be unwieldy and should therefore, when the cable-connected tool is moved, be guided in such a way that there is no risk of kinking the connection cable, which is usually particularly susceptible thereto, and that it does not impede the actual machining, for example by colliding with machine parts of the machine tool.

For this reason, said connection cables are pretensioned with apparatus configured for this purpose in order to ensure a certain degree of tensile force in the connection cable and thus, for example, to reduce deflection caused by its own weight or problems when winding or unwinding the connection cable.

Solutions known from the prior art use a spring-based retractor, a spring-loaded drum or a tension weight for such purposes.

For example, patent application US 2012/037274 A1 discloses a laser-based machine tool for woodworking which includes a system for guiding and tensioning a flexible connection cable. In order to track the movements of the tool configured as a laser head and thereby prevent the connection cable from curling, it runs over a series of deflection rollers, some of which are configured to apply a pretension to the connection cable via spring retractors.

Outside the field of machine tools, utility model DE 20 2019 102323 U1 also comprises a system for retraction guidance of a connection cable for an electric vehicle, wherein said system includes a plurality of deflection rollers and the connection cable running therein is pretensioned by a tension weight configured as a lever.

However, one problem of a machine tool with such cable guides is that a guide running over a plurality deflection rollers usually takes up a lot of the valuable installation space of the machine tool and that the pretension of the connection cable can only be adjusted insufficiently, especially with regard to various application-related deflection states or displacements of the cable end connected to the tool.

SUMMARY OF THE INVENTION

Therefore, it is an object of the present invention to provide a machine tool with a space-saving apparatus for guiding the connection cable of a cable-connected tool and to ensure that a pretension of the connection cable is adapted to different deflection states of the tool.

To achieve this object, there is proposed a numerically controlled machine tool comprising a cable guiding apparatus as described and claimed herein. Furthermore, there is proposed a cable guiding apparatus configured to guide a flexible connection cable as described and claimed herein.

The respective dependent claims relate to preferred embodiments of the apparatus according to the invention, which may be provided individually or in combination.

According to a first aspect of the invention, a numerically controlled machine tool comprising a cable guide apparatus for providing and guiding a flexible connection cable of a cable-connected tool is provided. The machine tool comprises at least one machining apparatus configured to receive the cable-connected tool and one or more numerically controlled machine axes configured to position the machining apparatus and a workpiece to be machined relative to one another. The cable guide apparatus of the machine tool comprises a first guide apparatus, a slide movably guided in the guide apparatus, a first deflection roller rotatably connected to the slide, a first tension weight $G_1$ and a cable pull apparatus connecting the first tension weight $G_1$ to the slide guided in the first guide apparatus, wherein the flexible connection cable runs over the first deflection roller and connects the cable-connected tool to a connection apparatus of the machine tool. The cable guide apparatus further comprises a second tension weight $G_2$ and a second guide apparatus in which the tension weights $G_1$ and $G_2$ are each movably guided. The cable guiding apparatus is configured such that the connection cable running over the first deflection roller is pretensioned, in a first displacement region of the cable-connected tool, by a force generated by the weight of tension weight $G_1$ and, in a second displacement region of the cable-connected tool, is pretensioned by a force generated by a sum of the weights of tension weight $G_1$ and tension weight $G_2$.

The cable-connected tool may be received by the machining apparatus of the machine tool and moved by it via numerically controlled machine axes in order to arrange it opposite the workpiece to be machined. The flexible connection cable is connected to the connection apparatus of the machine tool at a fixed end and the other free end is connected to the cable-connected tool. The flexible design of the connection cable makes it possible to move the cable-connected tool through the machining apparatus while maintaining the connection to the connection apparatus of the machine tool established via the connection cable. The flexibly designed connection cable may be a trailing cable for connecting two machine parts that are movable relative to one another, in this case the connection apparatus and the tool.

The connection apparatus of the machine tool provides the materials and/or media and/or signals required for the operation of the cable-connected tool, which are conveyed to and/or from the cable-connected tool via the connection cable connected to the connection apparatus. Here, the materials and/or media and/or signals conveyed through the connection cable may be electrical, optical or material in the form of solid, liquid or gaseous substances. The connection may preferably be bidirectional so that it is not only possible to convey said materials and/or media and/or signals from the connection apparatus to the cable-connected tool, but also from the tool to the connection apparatus. Examples thereof are suction apparatus which suction particles and/or gases produced during machining and route them to the connection apparatus or the transmission of electrical signals from a sensor apparatus additionally attached to the tool.

The central requirements of the machine tool according to the invention with a cable-connected tool include providing and guiding the described connection cable. The cable must have an appropriate pretension so that it can be guided over the first pulley without any problems, without curling or jamming. At the same time, an appropriate pretension ensures a reduction in the deflection caused by the dead weight of the connection cable, which under certain circumstances would unnecessarily impede machining. Both of these points are reliably prevented in the case of the machine tool according to the invention since the cable guide apparatus provides two displacement regions in which the connection cable is pretensioned by two forces that are usually constant but of different magnitudes. In contrast to spring retraction-based pretensioning, pretensions that remain as constant as possible can be realized in the connection cable in an advantageous manner. This is advantageous not only with regard to material stress on the connection cable but also with regard to the machining accuracy of the machine tool since only a largely constant retraction force acting on the machining apparatus through the connection cable has to be taken into account during machining when controlling the machine tool.

By moving the tool within the first displacement region, the connection cable is unwinded via the first deflection roller and leads, via the cable pull apparatus, to a displacement of the first tension weight $G_1$ in the second guide apparatus. In this region, the connection cable is pretensioned using the weight of the first tension weight $G_1$, said force being transmitted via the cable pull apparatus.

The pretension of the connection cable caused by the first tension weight $G_1$ in the first displacement range can be used as the basic pretension in an initial state in which the cable-connected tool is, for example, in a rest position and is not being used for machining the workpiece at this point in time. This basic pretension ensures a consistently uniform pretension in the connection cable in said rest position, without unnecessarily loading the connection cable with too high a pretension or preventing the tool from tipping in the rest position. The material stress on the connection cable can be kept comparatively low in this position so as not to unnecessarily reduce the service life of the connection cable and/or its connection elements to the connection apparatus of the machine tool or tool.

When the displacement of the cable-connected tool enters into the second displacement region, a displacement of the tool causes the connection cable to unroll over the first deflection roller, with both the first tension weight $G_1$ and the second tension weight $G_2$ being moved in the second guide apparatus via the cable pull apparatus. As a result, the connection cable is pretensioned in this region using the sum of the weights of the first tension weight $G_1$ and the second tension weight $G_2$, which is transmitted via the cable pull apparatus.

The second guide apparatus is configured such that, during the transition from the first to the second displacement region, the weight of the second tension weight $G_2$ also begins to act on the pretension of the connection cable via the cable pull apparatus.

The additional pretension of the connection cable in the second displacement region, which is caused by the weight of the second tension weight $G_2$, may be used in an advantageous manner during machining operations with a cable-connected tool received by the machining apparatus. The second displacement range is therefore adapted to displacements of the cable-connected tool from its rest position, which usually occur during machining processes. For example, a large deflection of the connection cable caused by its own weight can be greatly reduced by the pretension effected by the two tension weights $G_1$ and $G_2$.

Furthermore, the machine tool according to the invention having a cable guide apparatus proves to be particularly advantageous in that the cable guide, for example in contrast to the embodiment with a plurality of deflection rollers shown in patent application US 2012/037274 A1, only pretensions the cable via the first deflection roller so that a significantly more space-saving embodiment becomes possible. Such space saving turns out to be extremely advantageous, in particular in the context of industrial mass production, in which the installation space for machine tools is limited. Furthermore, depending on the nature of the connection cable, the masses of the two tension weights $G_1$ and $G_2$ may easily be adapted to the requirements of the connection cable, e.g. by exchanging the tension weights, in order to ensure optimal guidance and pretension of the connection cable without stressing its material too heavily.

The first and/or the second guide apparatus may advantageously be configured as linear guides with two parallel guide rails. This enables a space-saving and cost-effective configuration.

In a particularly preferred embodiment, the second guide apparatus includes a stop apparatus $AG_1$ for the first tension weight $G_1$ and a stop apparatus $AG_2$ for the second tension weight $G_2$, which define the starting positions of the tension weights $G_1$ and $G_2$ with respect to the second guide apparatus and thus define the first and second displacement region.

The stop apparatus $AG_1$ and $AG_2$ define starting positions from which the tension weights $G_1$ and $G_2$ are moved via the cable pull apparatus by moving the cable-connected tool. The stop apparatus determine the two displacement regions and their transition point. The stop apparatus may advantageously be releasably connected to the second guide apparatus so that subsequent adjustment or adaptation of the first and second displacement regions becomes possible.

In a particularly preferred embodiment, the cable-connected tool to a cable-connected laser tool for laser-based machining.

In a particularly preferred embodiment, the cable-connected laser tool is configured for additive laser processing and the connection cable of the cable-connected laser tool has at least one or more feed lines for powder mixtures for additive laser processing and a line fiber for laser guidance on the inside.

In particular, cable-connected tools are used in laser-based processing of workpieces, with the machine tool according to the invention having cable guidance being particularly advantageously suitable for the use of a laser tool for additive laser processing. The highly sensitive supply line, which conveys the materials essential for processing and guides the laser, can be reliably guided via a small number of deflections from the connection apparatus of the machine tool to the tool. The laser is usually guided to the laser tool via a fiber-based optical waveguide.

In a particularly preferred embodiment, the cable guide apparatus is configured such that a bending radius of the connection cable does not fall below a cable-specific minimum bending radius.

In particular with regard to a connection cable for a tool for additive laser processing, this embodiment is particularly advantageous since the feed lines running inside the connection cable cannot be damaged by kinks when maintaining a minimum bending radius.

For such an application, values for the minimum bending radius of the connection cable are usually between 150 mm and 300 mm.

In a particularly preferred embodiment, the machine tool has a work space configured for machining on the workpiece and a cable guide space adjacent to one side of the work space, wherein the cable guide space and the work space are separated from one another by a partition wall provided with an opening, and the cable guide apparatus arranged in the cable guide space is configured to guide the connection cable through the opening in the partition wall into the work space.

The cable guide space is advantageously arranged separately from the work space on one side of the machine tool. In this way, the cable guide apparatus may advantageously be made accessible from outside the machine tool, i.e. not via the work space, in order to simplify maintenance work, for example. The spatial separation of the machining taking place in the work space and the cable guide of the connection cable in the cable guide space is advantageous in that contaminants generated during machining, e.g. in the form of powder particles or material chips, do not get into the cable guide apparatus and damage it.

The partition wall with the introduced opening should preferably be configured such that it does not impede the movement of the connection cable while minimizing the possibility of dirt entering the cable guide space.

In a particularly preferred embodiment, the machine tool also includes a controllable flap which is arranged at the opening in the partition wall and configured to close and open the opening in the partition wall.

As a supplement to the partition wall between the cable guide space and the work space, reliable protection of the cable guide apparatus can thus be achieved. In this case, the above-described rest position of the cable-connected tool may be set to be within the cable guide space. When the cable-connected tool is not used, it may be completely arranged in the cable guide space together with the connection cable and may be completely separated from the work space by closing the opening with the controllable flap.

In a particularly preferred embodiment, the cable guide apparatus also includes a second deflection apparatus configured to guide the connection cable coming from the connection apparatus and running over the first deflection roller through the opening in the partition wall into the work space.

The second deflection apparatus advantageously makes it possible to ensure a constant contact area between the connection cable and the first deflection roller and, moreover, to allow a certain freedom of movement for the connection cable in the work space. The second deflection apparatus is advantageously configured to allow movements of the connection cable not only in the cable direction so that the movements of the connection cable required for using the cable-connected tool may be carried out without risking twisting or jamming of the connection cable, in particular in the area of the first deflection roller.

In a particularly preferred embodiment, the machine tool also includes a storage station that configured to receive the cable-connected tool.

In a particularly preferred embodiment, the storage station for the cable-connected tool is configured to be movable and is also configured to be moved through the opening in the partition wall between a storage position P0 in the cable guide space and a transfer position P1 in the workspace.

In a particularly preferred embodiment, the first displacement region is defined in such a way that, when the tool is in the storage station, the displacement region extends from the storage position P0 in the cable guide space to the transfer position P1 in the work space.

The movable storage station may be used in an advantageous manner for storing the cable-connected tool when it is not in use and when it is provided at the machining apparatus. When not in use, the storage station with the cable-connected tool inside may be moved to the storage position P0, which is located entirely in the cable guide space and may preferably be completely separated from the work space by means of the controllable flap. In order to provide the cable-connected tool for reception by the machining apparatus of the machine tool, the storage station may be moved through the opening up to a transfer position P1 in the work space when the flap is open. Advantageously, the first displacement region may be defined such that, during movement of the storage station from the storage position P0 to the transfer position P1, the connection cable is only pretensioned by the weight of the first tension weight. In this way, a force acting on the tool due to the pretension of the connection cable may be kept low so that it does not tilt from the rest position or become jammed.

In a particularly preferred embodiment, the first and/or the second guide apparatus of the cable guide apparatus are arranged in such a way that the displacement directions of the slide guided in the first guide apparatus and/or the tension weights G1 and G2 guided in the second guide apparatus extend vertically or in parallel to the Earth's gravitational field.

For optimal utilization of the weights of the two tension weights $G_1$ and $G_2$, the two guide apparatus may be arranged in parallel with respect to the Earth's gravitational field. In addition, the risk of the tension weights $G_1$ and $G_2$ and the slide becoming jammed in the guide apparatus can be minimized in this way. Furthermore, the parts of the connection cable running to the first deflection roller or coming from the first deflection roller may also be oriented in parallel to the Earth's gravity field. In this way, the connection cable does not bend due to its own weight in these regions.

In a particularly preferred embodiment, the connection between the cable pull apparatus and the slide guided in the first guide apparatus is implemented via an elastic or a viscoelastic element.

Since displacement movements of the machining apparatus of the machine tool are usually jerky or fast, an additional elastic or viscoelastic element can also reduce dynamic effects transmitted to the cable guide apparatus, such as unwanted vibrations of the tension weights.

In a particularly preferred embodiment, the cable guide apparatus comprises, in addition to the two tension weights $G_1$ and $G_2$, N additional tension weights $[ZG_1, \ldots, ZG_n, \ldots, ZG_N]$, with $N \geq 1$ and $1 \leq n \leq N$, which are each movably guided in the second guide apparatus such that the connection cable running over the first deflection roller is in a (n+2)-th displacement region of the N+2 displacement regions of the cable-connected tool is pretensioned by a force generated by a sum of the weights of the tension weights $G_1$, $G_2$ and $ZG_1$ to $ZG_n$.

The invention is therefore not limited to a cable guide apparatus with only two tension weights, but may be advantageously further developed through the use of further additional tension weights. The number of additional tension weights is denoted by N, for example for the case N=0, two tension weights and, for the case N=1, three tension weights are arranged in the second guide apparatus, etc.; when the cable guide apparatus has a total of five tension weights, these are designated $G_1$, $G_2$, $ZG_1$, $ZG_2$ and $ZG_3$.

By using a plurality of tension weights, a correspondingly large number of displacement regions with different levels of pretension of the connection cable may be provided in an advantageous manner. Depending on the geometric size of the machine tool or the traversing distances of the cable-connected tool held by the machining apparatus, the necessary pretension may be implemented even for relatively large distances of the freely hanging connection cable in order to avoid excessive deflection caused by its own weight.

According to the embodiment with N additional tension weights, the second guide apparatus may have up to N additional stop apparatus [$ZAG_1, \ldots, ZAG_n, \ldots, ZAG_N$] that define the starting positions of the additional tension weights [$ZG_1, \ldots, ZG_n, \ldots, ZG_N$] with respect to the second guide apparatus and thus define the further N displacement regions.

In a particularly preferred embodiment, the second guide apparatus includes a stop apparatus $AG_1$ for the first tension weight $G_1$ and a stop apparatus $AG_2$ for the second tension weight $G_2$, which define the starting positions of the tension weights $G_1$ and $G_2$ with respect to the second guide apparatus and thus define the first and second displacement regions.

In a particularly preferred embodiment, the slide guided in the first guide apparatus is also connected to the machine tool via a restoring elastic element acting in the displacement direction of the slide.

Such a restoring elastic element may be configured, for example, in the form of a spring which generates a restoring force that is dependent on the displacement of the slide and acts on the slide itself for additional pretension of the connection cable. In addition to the forces that are constant in the individual displacement regions of the cable-connected tool and are caused by the weights of the tension weights $G_1$ and $G_2$, the displacement-dependent restoring force also acts on the pretension of the connection cable. Depending on the configuration of the spring and its specific spring characteristic (e.g., linear dependency or polynomial dependency of a higher degree), any piecewise continuous, polynomial pretension curves may be provided for the connection cable depending on the displacement of the cable-connected tool. As a result, the curve of the pretension in the respective displacement regions can be optimally adapted to specific applications.

In a particularly preferred embodiment, the machining apparatus of the machine tool is configured to be moved via three numerically controlled machine axes configured as linear axes.

In a particularly preferred embodiment, the machine tool also includes two numerically controlled machine axes configured as rotary axes which are orthogonal or inclined to one another and which are configured to orient, with respect to the machining apparatus, a machine table configured to carry the workpiece.

The embodiment of the machine tool according to the invention with three linear axes for moving the machining apparatus and two rotary axes for orienting the workpiece-carrying machine table. The possibilities for positioning and orienting the workpiece to be machined in relation to the tool-carrying machining apparatus thus obtained allow comprehensive machining of the workpiece without having to reorient it on the machine table itself each time.

Advantageously, the machine table may be oriented via the rotary axes in such a way that it does not prevent the cable-connected tool from being received from and/or inserted in the movably configured storage station provided for this purpose.

According to a further aspect of the invention, a cable guide apparatus is provided for providing and guiding a flexible connection cable, the cable guide apparatus including a first guide apparatus, a slide movably guided in the first guide apparatus, a first deflection roller rotatably connected to the slide, a first tension weight $G_1$, and a cable pull apparatus connecting the first tension weight $G_1$ to the slide guided in the first guide apparatus. The flexible connection cable has a free end and a fixed end connected to a connection apparatus and runs over the first deflection roller. The cable guide apparatus also includes a second tension weight $G_2$ and a second guide apparatus in which the tension weights $G_1$ and $G_2$ are each guided in a movable manner. The cable guide apparatus is configured such that the connection cable running over the first deflection roller is pretensioned, in a first displacement region of the free end, by a force generated by the weight of tension weight $G_1$ and is pretensioned, in a second displacement range of the free end, by a force generated by a sum of the weights of tension weight $G_1$ and tension weight $G_2$.

The cable guide apparatus according to the invention is by no means limited to use on a numerically controlled machine tool, but may be used to guide and tension various types of connection cables, for which pretensioning with different force levels proves to be particularly advantageous. The advantages listed below also apply to the previously described machine tool having a cable guide apparatus.

The cable guide apparatus according to the invention is suitable, among other things, for use at fixed and/or mobile supply stations configured to connect a supply source to a consumer via an adapter specifically formed at the free end of the connection cable. The medium conveyed by the connection cable may be electrical, optical or material in the form of solid, liquid or gaseous substances. Non-limiting examples thereof are charging stations for supplying electrical energy to vehicles or vehicle-like apparatus, fueling or pumping stations to supply a consumer with gaseous and/or liquid fuel, or compressed air supply apparatus for various tools.

The pretension of the connection cable caused by the first tension weight $G_1$ in the first displacement region may be used as the basic tension in an initial state, e.g. in a starting position of the adapter provided for establishing the connection. Said basic tension ensures a constant position of the adapter as well as a consistently uniform pretension in the connection cable in said starting position. In order to keep the material stress on the connection cable and the individual parts of the cable guide low in such a starting position and thus not to unnecessarily shorten their service life, the pretension caused by the first tension weight $G_1$ may be chosen to be relatively low.

Deflection of the free end or the adapter with the aim of establishing a connection with a consumer usually requires an adjustment of the pretension of the connection cable since the pretension set for the starting position is usually no longer sufficient as the deflection of the cable end or the adapter increases. For example, a large deflection of the connection cable caused by its own weight cannot be reliably prevented by a single tension weight, in this case the first tension weight $G_1$, so that use may be unwieldy and the desired function may be unnecessarily impeded.

Such a scenario may be prevented by the additional use of the second tension weight $G_2$ provided within the scope of the apparatus according to the invention since the connection cable is advantageously pretensioned in the process of establishing the connection described not only using the weight of the first tension weight $G_1$ but also using the weight of both tension weights $G_1$ and $G_2$. The second displacement region of the apparatus according to the invention is to be adapted to the specific circumstances and follows the first displacement region after a relatively small deflection of the free end or the adapter.

In contrast to using a pretension based on a spring return, the apparatus according to the invention is particularly advantageous since constant pretensions are present in the connection cable with increasing deflection/displacement of the free end or the adapter in both the first and second displacement regions. On the other hand, for example, a spring return with a pretension of the connection cable that increases as a function of the deflection only unnecessarily complicates the deflection of the free end/adapter, which is usually carried out by a person, particularly in the case of large displacement amounts.

In a particularly preferred embodiment, the cable guide apparatus further comprises one or more consecutive further deflection apparatus configured to deflect the connection cable coming from the fixed end at the connection apparatus and running over the first deflection roller.

The deflection of the connection cable via further deflection apparatus ensures that the apparatus can be used in different configurations so that a pull-out direction of the free end of the connection cable can extend in different spatial directions with respect to the cable guide apparatus. When, for example, the cable guide apparatus according to the invention is used in a supply station as described above, a pull-out direction extending in parallel to the base surface may prove to be advantageous when the supply station is provided on a base level, whereas, in the case of a supply station provided at a height above the base surface, a pull-out direction orthogonal to the base surface may prove to be advantageous.

In a particularly preferred embodiment, the cable guide apparatus comprises, in addition to the two tension weights $G_1$ (121) and $G_2$ (122), N additional tension weights $[ZG_1, \ldots, ZG_n, \ldots, ZG_N]$ with $N \geq 1$ and $1 \leq n \leq N$, which are each movably guided in the second guide apparatus such that the connection cable running over the first deflection roller in a (n+2)-th displacement region of the N+2 displacement regions of the cable-connected tool is pretensioned by a force generated by a sum of the weights of the tension weights $G_1$, $G_2$ and $ZG_1$ to $ZG_n$.

The cable guide apparatus according to the invention is therefore not limited to use with only two tension weights, but may advantageously be further developed by the use of further additional tension weights. The number of additional tension weights is denoted by N, wherein, for example, for the case N=0, two tension weights and, for the case N=1, three tension weights are arranged in the second guide apparatus, etc.; when the cable guide apparatus includes a total of five tension weights, these are designated $G_1$, $G_2$, $ZG_1$, $ZG_2$ and $ZG_3$.

The multiple displacement regions obtained in this way with different degrees of pretension of the connection cable may thus be advantageously adapted to the application-specific deflections of the free end.

Further aspects and advantages thereof as well as more specific implementation options for the aspects and features mentioned above are described below with the aid of the drawings shown in the attached figures.

Here, the same or similar elements in the figures may be denoted by the same reference symbols, but sometimes also by different reference symbols.

It is emphasized that the present invention is in no way limited to the exemplary embodiments described below and implementation features thereof. The invention also includes modifications of the exemplary embodiments mentioned, in particular those resulting from modifications and/or combinations of one or more features of the exemplary embodiments described within the scope of the independent claims.

DETAILED DESCRIPTION OF THE FIGURES

Figure 1:
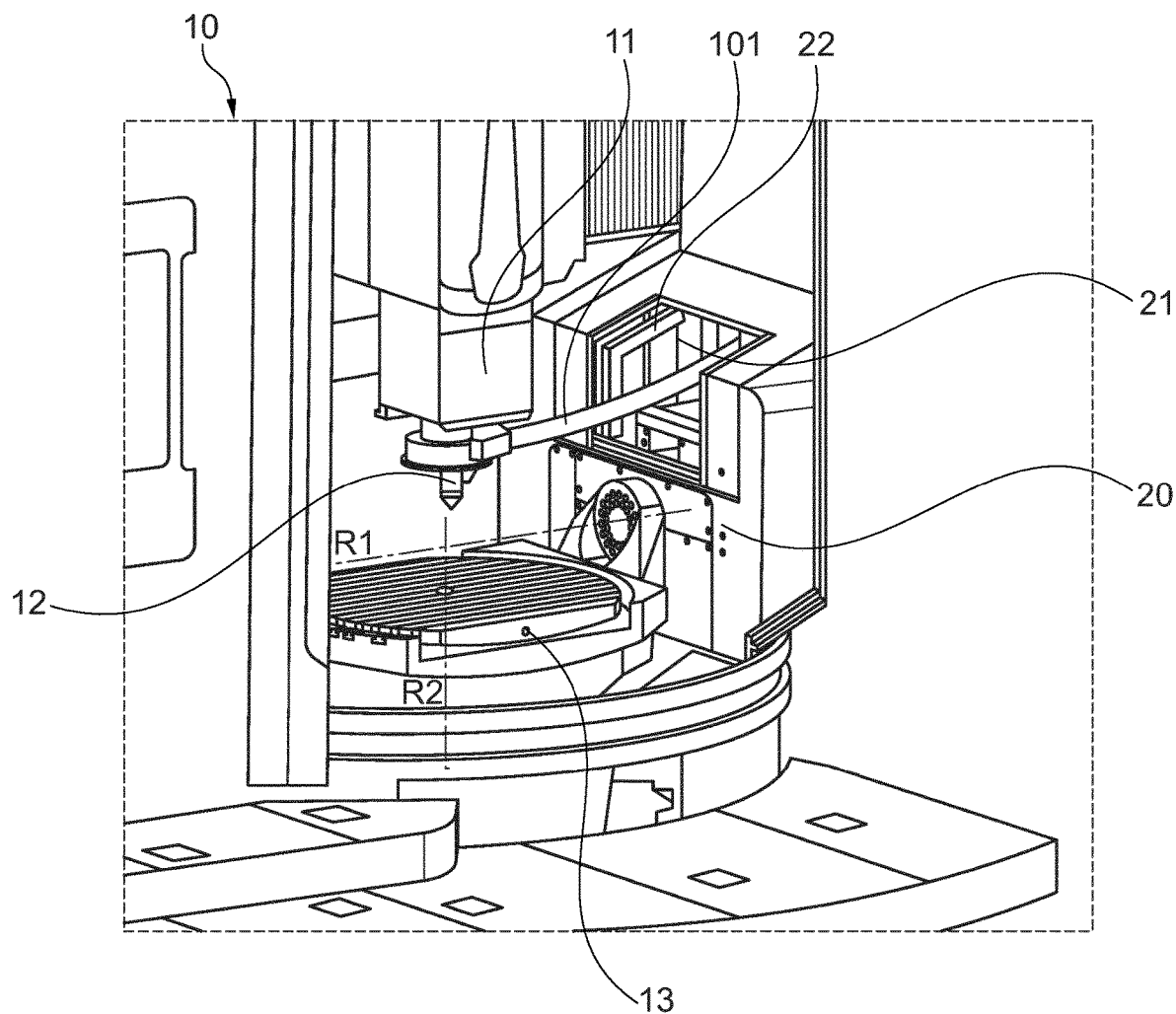
FIG. 1 shows a perspective view of a machine tool configured for laser-based machining, with a view of the work space.

FIG. 1 shows a perspective view of a machine tool 10 configured for laser-based machining according to the invention, with a view of the work space.

The illustration shows the numerically controlled machine tool 10 with a machining apparatus 11 that can be moved via three linear axes and carries a cable-connected tool 12, in this case a tool configured for laser machining, with a flexible connection cable 101.

The machining apparatus 11 with the tool 12 received is used for machining a workpiece (not shown here) fastened on the machine table 13, wherein the machine table 13 can be oriented in relation to the machining apparatus 11 via the two machine axes R1 and R2 which are orthogonal to one another and are configured as rotary axes.

The view shows the work space of the machine tool 10 in which the machining is performed on the workpiece attached to the machine table 13. The connection cable 101 of the cable-connected tool 12 is provided and guided by the cable guide apparatus 100 (not shown in this figure) which is arranged behind the partition wall 20 in the cable guide space adjacent to the work space. As a result, sensitive machine parts of the cable guide apparatus 100 are protected from contamination created during machining.

The connection cable is introduced through the opening 21 made in the partition wall 20, which in the exemplary embodiment shown can be closed by means of the controllable flap 22, which is shown in the open state in FIG. 1.

If the cable-connected tool 12 is not used, it is advantageously arranged in the cable guide space, which may be completely separated from the work space by closing the controllable flap 22.

By using the cable guide apparatus 100 (not shown here), the connection cable is pretensioned when used by the machining apparatus 11 according to the second displacement region by a force based on the sum of the weights of the two tension weights $G_1$ 121 and $G_2$ 122, so that a deflection of the connection cable 101 caused by its own weight as shown in FIG. 1 is greatly reduced. As a result, an obstruction of the machining of the workpiece due to the connection cable 101 or even a collision of the connection cable 101 with other machine parts of the machine tool 10, for example the machine table 13, can be prevented.

Furthermore, a reduction in the deflection of the connection cable is advantageous in that damage to the connection cable 101 itself as a result of excessive bending can be avoided.

Figure 2A:
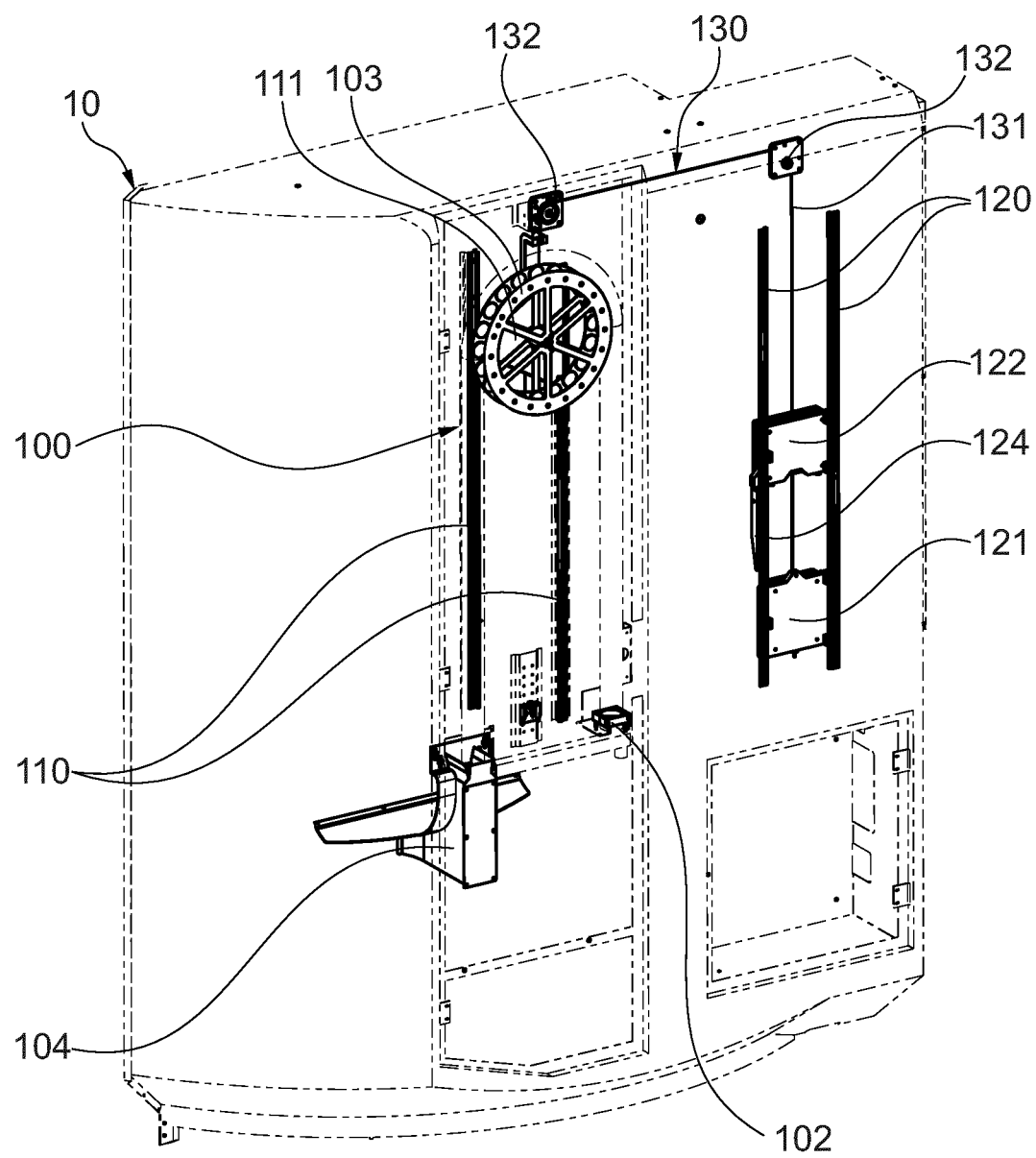
FIG. 2a shows a section of the machine tool according to the invention with a view of the cable guide apparatus but without a view of the connection cable.

FIG. 2a shows a section of the machine tool 10 according to the invention with a view of the cable guide apparatus 100, but without a view of the connection cable 101.

The illustration shows the two guide apparatus 110, 120, in which the slide 111 and the tension weights $G_1$ 121 and $G_2$ 122 are movably guided. The two guide apparatus 110, 120 are arranged vertically on one side of the machine tool 10 so that the displacement directions of the tension weights $G_1$ 121 and $G_2$ 122 and the slide 111 extend in parallel to the Earth's gravitational field. Moreover, the two guide apparatus 110, 120 in the exemplary embodiment shown are configured as guide rails arranged in parallel in order to ensure optimal and resistance-free guidance of the tension weights $G_1$ 121 and $G_2$ 122 and the slide.

In the exemplary embodiment shown, the cable pull apparatus 130 includes a connection cable 131 and two deflection rollers 132 and connects the slide 111 to the first tension weight $G_1$ 121.

The connection cable 101 (not shown here) runs from the connection apparatus 102 over the first deflection roller 103 and is guided by the second deflection apparatus 104 into the work space of the machine tool 10. The second deflection apparatus 104 is configured such that the connection cable 101 coming from the first deflection roller 103 and running vertically in this section is deflected on an approximately arc-shaped course into the work space, wherein a fall below a minimum bending radius of 200 mm of the connection cable 101 is not happening in this case. The second deflection apparatus 104 has a section that is tapered on the upper side so that the connection cable 101 entering at this point can be received in as precise a position as possible. The side of the second deflection apparatus that faces the work space for the supply line has a shape that is opening in order to ensure a corresponding freedom of movement of the cable-connected tool 12 when guided through the machining apparatus 11.

In contrast to the first deflection roller 103, the second deflection apparatus 104 is not configured to be movable. When moving, the connection cable slides over the surface of the second deflection apparatus, which is why a material pairing between the second deflection apparatus 104 and the connection cable 101 with the lowest possible coefficient of friction is to be preferred.

In the configuration of the cable guide apparatus 100 shown in FIG. 2a, only the weight of the first tension weight $G_1$ 121 acts via the connection cable 131 of the cable pull apparatus 130 on the slide 111 and thus on the first deflection roller 103 in order to pretension the connection cable 101 (not shown here).

The second tension weight $G_2$ 122 abuts against the stop apparatus $AG_2$ 124 configured for this purpose on the sides of the second guide apparatus 120. The second tension weight $G_2$ 122 is not connected to the connection cable 131 of the cable pull apparatus 130 so that its weight does not affect the pretension of the connection cable 101 in the configuration shown.

When the end of the connection cable 101 located at the tool 12 is increasingly deflected or shifted in the direction of the work space of the machine tool, the first deflection roller 103 is pulled vertically downward along the direction specified by the first guide apparatus 110.

Consequently, the cable pull apparatus 130 pulls the first tension weight $G_1$ 121 upwards along the direction specified by the second guiding apparatus 120. As the displacement of the first tension weight $G_1$ 121 increases, it comes into contact with the second tension weight $G_2$ 122, which is also guided in the second guide apparatus 120, at the transition between the first and second displacement regions. The contact surfaces of the two tension weights $G_1$ 121 and $G_2$ 122 are configured such that, as the first tension weight $G_1$ 121 is displaced upwards, the second tension weight $G_2$ 122 is also displaced. In this case, an underside of the second tension weight $G_2$ 122 rests on an upper side of the first tension weight $G_1$ 121. As a consequence, the weight of the second tension weight $G_2$ 122 now also acts, via contact with the first tension weight $G_1$ 121, on the connection cable 131 of the cable pull apparatus 130 and thus on the slide 111 connected to the first deflection roller 103, so that the connection cable 101 running thereover is pretensioned by a force based on the sum of the weights of the two tension weights $G_1$ 121 and $G_2$ 122.

Accordingly, during a downward movement of the first and second tension weights $G_1$ 121 and $G_2$ 122 starting from the second displacement region, when the stop apparatus $AG_2$ 124 is reached, there is a loss of contact between the two tension weights 121, 122, so that, upon the transition to the first displacement region, only the weight generated by the first tension weight $G_1$ 121 is used to pretension the connection cable 101.

The position of the stop apparatus $AG_2$ 124 may be used here to adjust a transition point between the first and the second displacement regions.

It should be noted at this point that the implementation of the individual displacement regions with the different pretensions of the connection cable 101, in particular their transition into one another, is not limited to the direct contact between the tension weights 121, 122 presented in this exemplary embodiment. The pretension with the aid of a plurality of tension weights 121, 122 may also be implemented by means of corresponding stops fixed at predetermined positions on the connection cable 131 of the cable pull apparatus 130, wherein the connection cable 131 is guided past the tension weights 121, 122 or through cutouts in the tension weights 121, 122 and, as a result of the increasing deflection of the connection cable 131, contact is made between such a stop on the connection cable 131 and one of the tension weights 121, 122, so that the weight of the relevant tension weight 121, 122 is applied to the connection cable 131 via the fixed stop and thus acts on the slide 111 in the first guide apparatus 110.

It should also be noted that the cable pull apparatus 130 is in no way limited to the structure shown in FIG. 2a, but may also be arranged in a tackle-like form in order to achieve different transmission ratios between the force caused by the weight of the tension weights 121, 122 and the pretension acting on on the connection cable 101.

The structure of the cable guide apparatus 100 shown in FIG. 2a may be provided on one side of the machine tool 10 with little installation space and has a comparatively low depth and is therefore extremely space-saving.

Figure 2B:
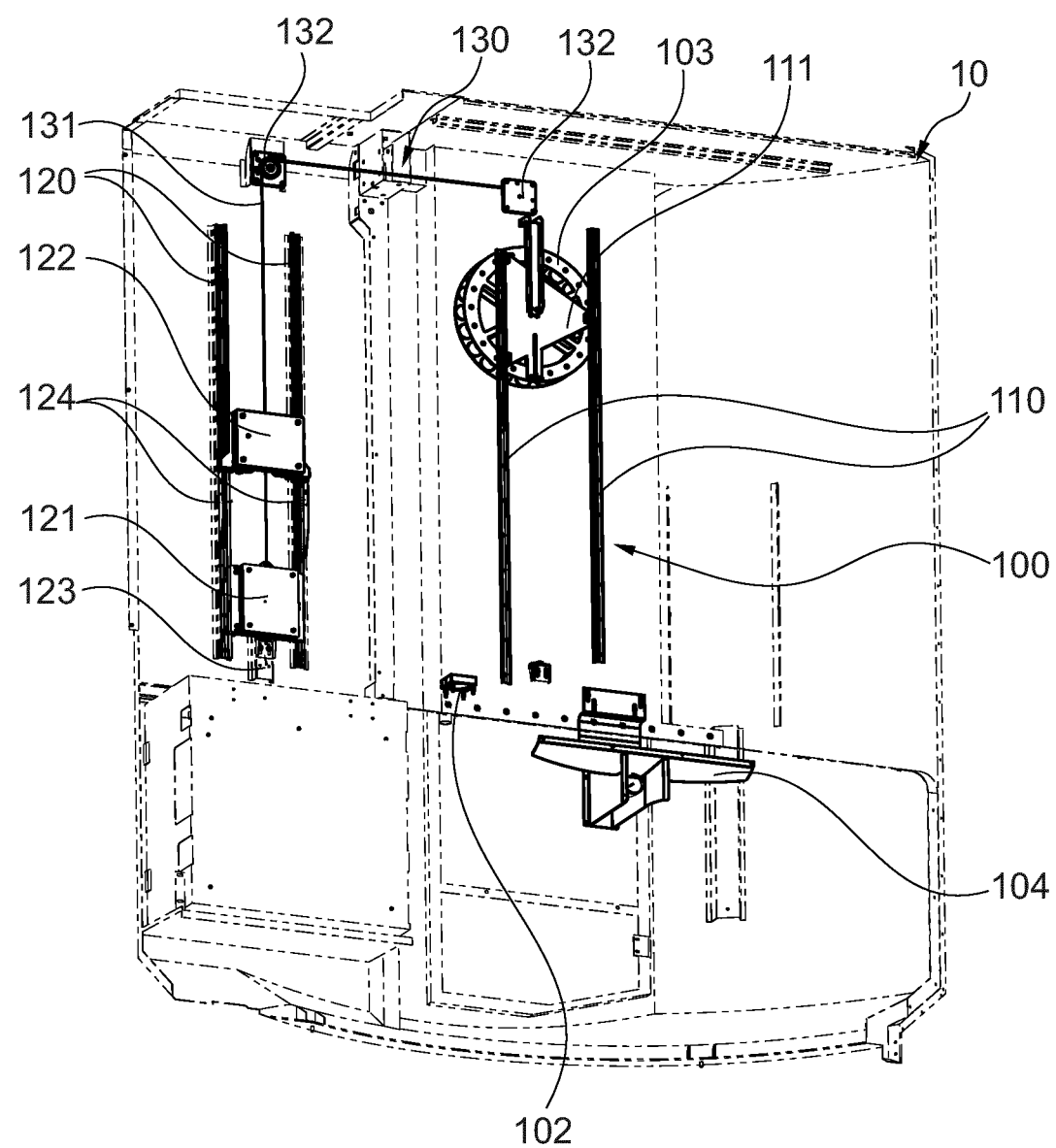
FIG. 2b shows the structure of the cable guide apparatus, which is the same as in FIG. 2a, on one side of the machine tool in an alternative perspective.

FIG. 2b shows the structure of the cable guide apparatus 100, which is the same as in FIG. 2a, on one side of the machine tool 10 in an alternative perspective.

As a supplement to the perspective shown in FIG. 2a, the stop apparatus $AG_1$ 123 for the first tension weight $G_1$ 121 is also shown in FIG. 2b.

The stop apparatus $AG_1$ 123 defines a starting position of the first tension weight $G_1$ 121 and thus defines the first displacement region of the cable guide apparatus 100, with the first tension weight $G_1$ additionally being prevented from falling out of the first guide apparatus 110. This proves to be particularly advantageous, for example, for maintenance and/or assembly work on the cable guide apparatus since, even if the connection cable 131 is free of tension or not fastened, the tension weight $G_1$ 121 cannot fall out of the guide.

Figure 3A:
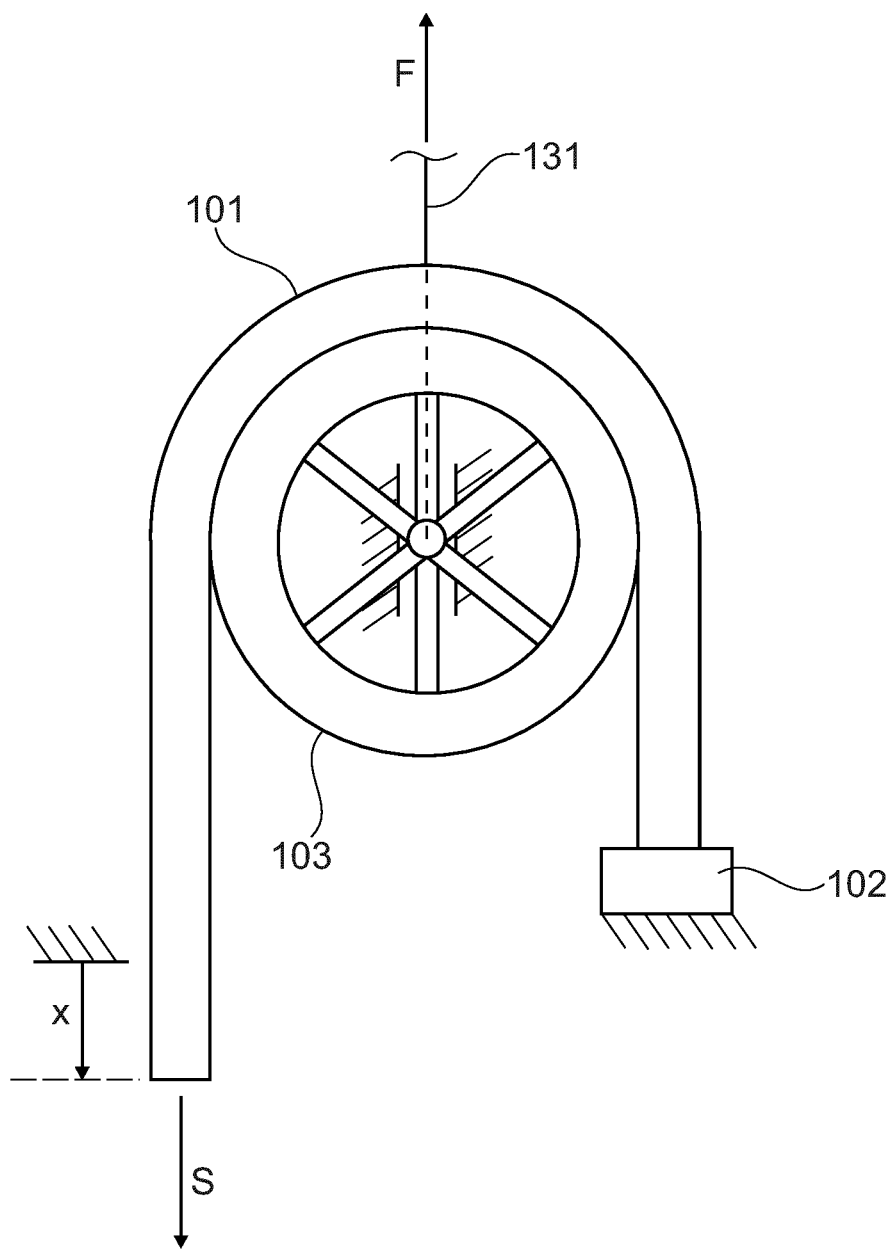
FIG. 3a shows a schematic sketch of part of the cable guide apparatus with a pretension of the connection cable being effected by the first deflection roller, the active forces being marked in a free body diagram.

There is also a detailed view of the slide 111 guided in the first guide apparatus 110. It has a triangular structure and is slidably mounted in one guide rail of the first guide apparatus 110 at two points and in the other guide rail of the first guide apparatus 110 at one point, so that jamming of the slide 111 can be reliably avoided. FIG. 3a shows a schematic sketch of a part of the cable guide apparatus 100 with a pretension of the connection cable 101 being effected by the first deflection roller 103, with the active forces being identified in a free body diagram.

The connection cable 101 coming from the connection apparatus 102 of the machine tool runs over the first deflection roller 103. A displacement of a point of the connection cable 101 after the first deflection roller 103 is denoted by x and indicates how strongly the connection cable 101 is deflected. The deflection roller is rotatably connected to the slide 111 (not shown in FIG. 3a), on which in turn a force F for pretensioning the connection cable 101 is exerted by the tension weights $G_1$ and $G_2$ via a connection cable 131 of the cable pull apparatus 130; the pretension is characterized by the free-body force S in FIG. 3a.

In the structure shown in FIG. 3a, the relationship S=0.5*F applies to the free-body force S as a function of the force F acting on the slide. Here, the free-body force S is interpreted as the normal force acting in the connection cable.

A deflection x>0 causes the first deflection roller 103, on which the force F acts, to be pulled downwards, wherein, depending on the deflection x, the force F is either based on the weight of the first tension weight $G_1$ 121 in the first displacement region or on the sum of the weights of the two tension weights $G_1$ 121 and $G_2$ 122 in the second displacement region.

Figure 3B:
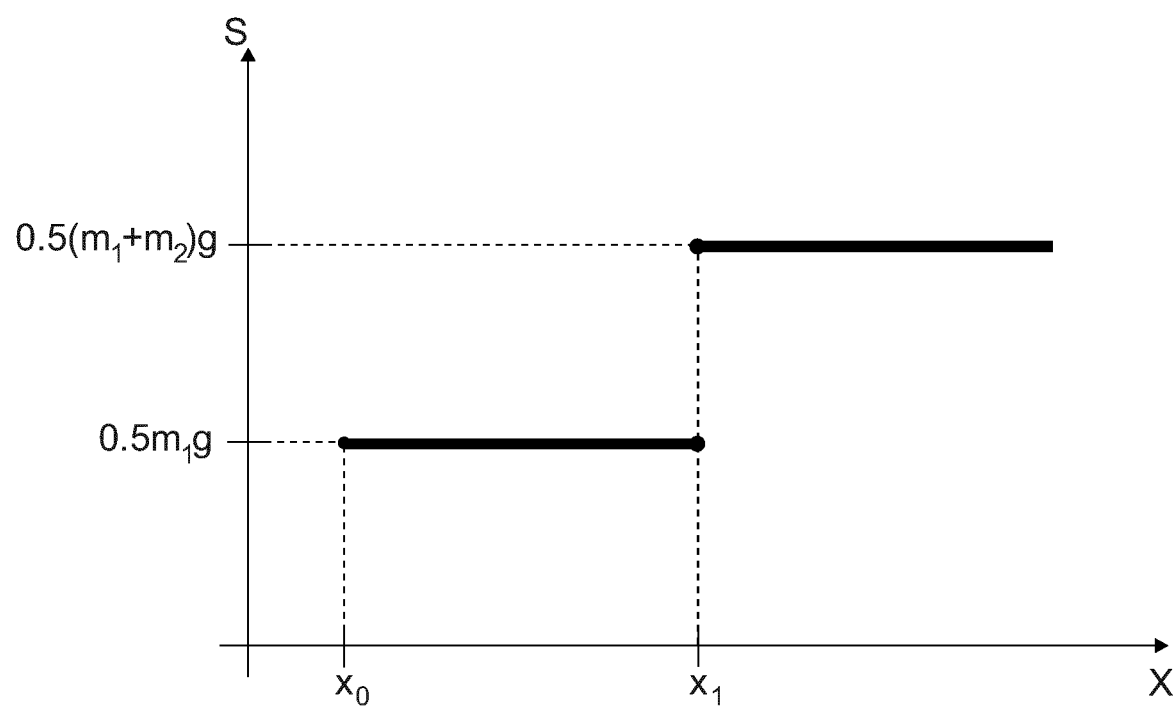
FIG. 3b shows, as a supplement to the schematic diagram of the structure in FIG. 3a, an exemplary curve of the pretension acting on the connection cable via the first deflection roller of the cable guide apparatus.

FIG. 3b shows, as an addition to the schematic illustration of the structure in FIG. 3a, an exemplary curve of the pretension acting on the connection cable 101 through the first deflection roller 101 of the cable guide apparatus 100.

The masses of the tension weights $G_1$ 121 and $G_2$ 122 are denoted by the formula symbols $m_1$ and $m_2$ and the gravitational constant of the Earth's gravitational field is denoted by g. S designates the free-body force in the connection cable 101 that describes the pretension and x the deflection or displacement state thereof.

In the piecewise continuous curve shown, the first displacement region is in the range $x_0<x<x_1$ in which a weight of $m_1 g$ acts on the slide via the cable pull apparatus 130. According to the force relationship described in the description of FIG. 3a, a free-body force $S=0.5\, m_1 g$ is thus obtained in the connection cable.

From a deflection $x=x_1$, the transition from the first to the second displacement region occurs, as a result of which, for deflections $x>x_1$, the pretension of the connection cable 101 is based on the sum of the weights of the two tension weights $G_1$ 121 and $G_2$ 122: $S=0.5(m_1 g+m_2 g)$.

The exact position of the transition point $x=x_1$ may be determined, inter alia, by the position of the stop apparatus $AG_1$ and $AG_2$ in the second guide apparatus 120, With regard to the embodiment of the machine tool 10 with the movable storage station 140, the storage position P0 is to be selected such that it lies in the first displacement region with $x_0<x<x_1$. The transfer position P1 for transferring the cable-connected tool 12 to the machining apparatus 11 is preferably to be selected in the immediate vicinity of the transition point $x=x_1$ within the first displacement region.

It is to be noted that the physical relationships shown in FIGS. 3a and 3b are based on simplifying assumptions and, for example, the effects of friction or the own weight of the connection cable 131 and the like were not taken into account since the illustration shown only serves to describe the mechanism functionally.

Even if this is not explicitly shown, the use of N additional tension weights (with N≥1) results, for the piecewise continuous curve of the pretension shown in FIG. 3b, in N further pretension stages with a respective displacement region in addition to the two pretension stages shown. With increasing deflection, the specified pretension, which is constant over a pretension region, turns out to be greater than the pretension in a previous pretension stage. This results in a step-like pretension profile with N+2 (pretension) stages in the direction of increasing deflections.

Figure 4:
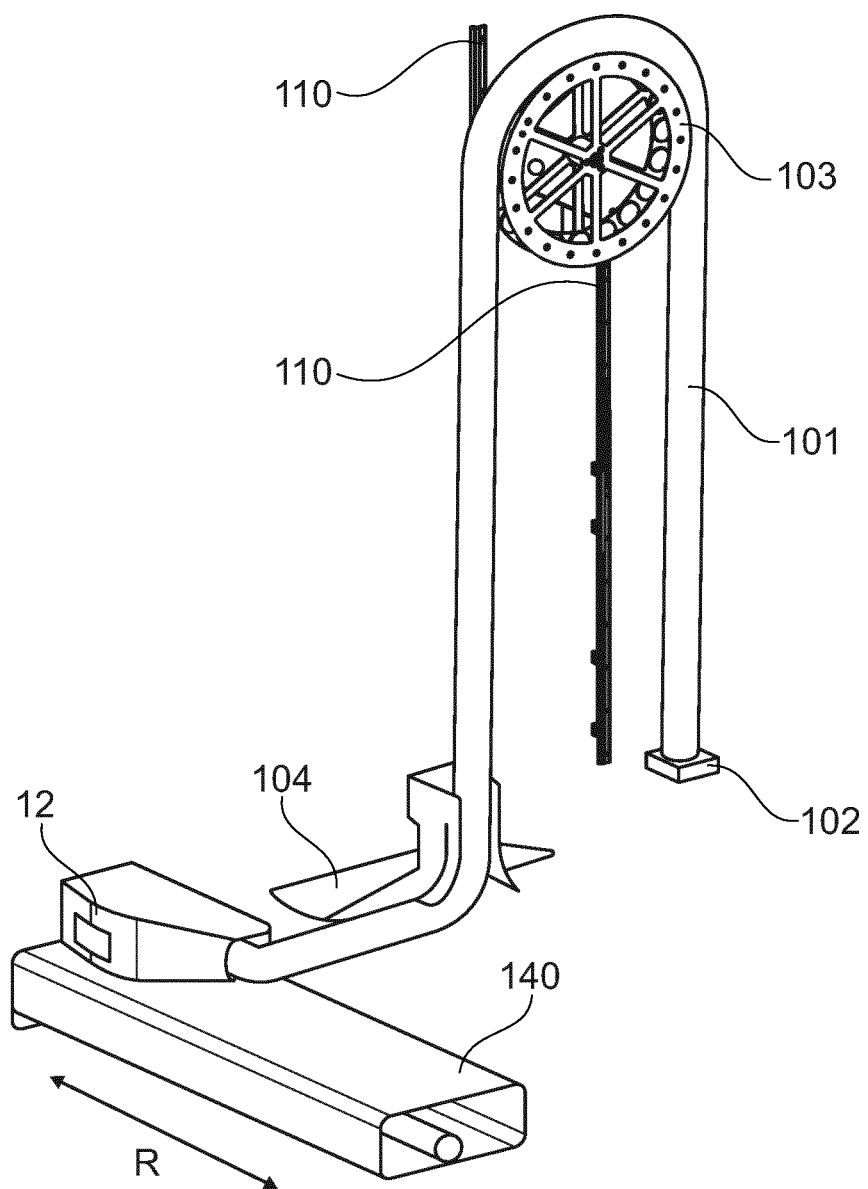
FIG. 4 shows a reduced view of a section of the cable guide apparatus with a movable storage station for the cable-connected tool.

FIG. 4 shows a reduced illustration of a section of the cable guide apparatus 100 with the movable storage station 140 for the cable-connected tool 12. The tension weights $G_1$ 121 and $G_2$ 122 and the cable pull apparatus 130 are not shown in FIG. 4.

The connection cable 101 running over the first deflection roller 103 and over the second deflection apparatus 104 connects the connection apparatus 102 of the machine tool 10 to the cable-connected tool 12.

In the illustration shown in FIG. 4, the cable-connected tool 12 is not received by the machining apparatus 11 but is arranged in the storage station 140 of the machine tool 10, which is configured to be movable in the direction R.

To receive the cable-connected tool 12, the storage station 140 has a cutout on an upper side which is adapted to an outer contour of the tool 12 and into which the tool can be inserted with a precise fit.

The storage station 140 is configured to be moved in the direction R from a storage position P0 to a transfer position P1 in order to be received there by the machining apparatus 11 of the machine tool, with the direction of travel R advantageously extending orthogonally to the Earth's gravitational field.

The storage station 140 is positioned in such a way that the section of the connection cable 101 coming from the second deflection apparatus 104 runs almost in parallel to the direction of travel R. Consequently, the force acting on the cable-connected tool 12 from the connection cable 101 acts almost in parallel to the direction of travel R so that jamming of the tool 12 in the storage station can be avoided. Jamming is additionally prevented by the inventive configuration of the cable guide apparatus 100 of the machine tool since the pretension of the connection cable 101 when the tool 12 is in the storage station is preferably only effected by the weight of the first tension weight 121.

LIST OF REFERENCE SYMBOLS 10 machine tool
11 machining apparatus
12 cable-connected tool
13 machine table
20 partition wall
21 opening in the partition wall
22 flap
100 cable guide apparatus
101 connection cable
102 connection apparatus
103 first deflection roller
104 second deflection apparatus
110 first guide apparatus
11 slide
120 second guide apparatus
121 first tension weight $G_1$
122 second tension weight $G_2$
123 first stop apparatus $AG_1$ for first tension weight $G_1$
124 second stop apparatus $AG_2$ for first tension weight $G_2$
130 cable pull apparatus
131 connection cable
132 deflection roller
140 storage station
S free-body force in the connection cable
F pulling force of the cable pull apparatus
R direction of travel of the storage station
R1 first rotary axis
R2 second rotary axis

The invention claimed is:

1. A numerically controlled machine tool (10) having a cable guide apparatus (100) for providing and guiding a flexible connection cable (101) of a cable-connected tool (12), said machine tool (10) comprising at least:
a machining apparatus (11) configured to receive the cable-connected tool (12),
one or more numerically controlled machine axes configured to position the machining apparatus (11) and a workpiece to be machined relative to one another, and the cable guide apparatus (100) comprises:
a first guide apparatus (110),
a slide (111) movably guided in the first guide apparatus (110),
a first deflection roller (103) rotatably connected to the slide (111),
a first tension weight $G_1$ (121),
a cable pull apparatus (130) connecting the first tension weight $G_1$ (121) to the slide (111) guided in the first guide apparatus (110),
wherein the connection cable (101) runs over the first deflection roller (103) and connects the cable-connected tool (12) to a connection apparatus (102) of the machine tool (10),
wherein
the cable guide apparatus (100) further comprises:
a second tension weight $G_2$ (122), and
a second guide apparatus (120) in which the tension weights $G_1$ (121) and $G_2$ (122) are each guided in a movable manner,
such that the connection cable (101) running over the first deflection roller (103) is pretensioned in a first displacement region of the cable-connected tool (12) by a force generated by the weight of the first tension weight $G_1$ (121) and
is pretensioned in a second displacement region of the cable-connected tool (12) by a force generated by a sum of the weights of the tension weights $G_1$ (121) and $G_2$ (122).

2. The machine tool (10) according to claim 1, wherein the second guide apparatus (120) includes a first stop apparatus $AG_1$ (123) for the first tension weight $G_1$ (121) and a second stop apparatus $AG_2$ (124) for the second tension weight $G_2$ (122) which define the respective starting positions of the tension weights $G_1$ (121) and $G_2$ (122) with respect to the second guide apparatus (120) and thus define the first and the second displacement regions.

3. The machine tool (10) according to claim 1, wherein the cable-connected tool (12) is a cable-connected laser tool for laser-based machining.

4. The machine tool (10) according to claim 3, wherein the cable-connected laser tool (12) is configured for additive laser processing and the connection cable (101) of the cable-connected laser tool (12) includes at least one or more feed lines for powder mixtures for additive laser processing and a line fiber for laser guidance on the inside.

5. The machine tool (10) according to claim 1, wherein the cable guide apparatus (100) is configured such that a bending radius of the connection cable (101) does not fall below a cable-specific minimum bending radius.

6. The machine tool (10) according to claim 1, wherein the machine tool (10) has a work space configured for machining on the workpiece and a cable guide space adjacent to one side of the work space, wherein the cable guide space and the work space are separated from each other by a partition wall (20) provided with an opening (21) and the cable guide apparatus (100) arranged in the cable guide space is configured to guide the connection cable (101) through the opening (21) of the partition wall (20) into the work space.

7. The machine tool (10) according to claim 6, wherein the machine tool further includes a controllable flap (22) which is arranged at the opening (21) of the partition wall (20) and is configured to close and open the opening (21) of the partition wall (20).

8. The machine tool (10) according to claim 6, wherein the cable guide apparatus (100) further comprises a second deflection apparatus (104) configured to guide the connection cable (101), which comes from the connection apparatus (102) and runs over the first deflection roller (103), through the opening (21) of the partition wall (20) into the work space.

9. The machine tool (10) according to claim 6, wherein the machine tool (10) further comprises a storage station (140) configured to receive the cable-connected tool (12).

10. The machine tool (10) according to claim 9, wherein the storage station (140) for the cable-connected tool (12) is configured to be movable and configured to be moved through the opening (21) in the partition wall (20) between a storage position P0 in the cable guide space and to a transfer position P1 in the work space.

11. The machine tool (10) according to claim 10, wherein the first displacement region is defined such that, when the tool (12) is in the storage station (140), it extends from the storage position P0 in the cable guide space to the transfer position P1 in the work space.

12. The machine tool (10) according to claim 1, wherein the first and/or the second guide apparatus (110, 120) of the cable guide apparatus (100) are arranged such that directions of displacement of the slide (111) and/or the tension weights $G_1$ (121) and $G_2$ (122) guided in the second guide apparatus (120) extend vertically or in parallel to the Earth's gravitational field.

13. The machine tool (10) according to claim 1, wherein the connection between the cable pull apparatus (130) and the slide (111) guided in the first guide apparatus (110) is configured via an elastic or a viscoelastic element.

14. The machine tool (10) according to claim 1, wherein the cable guide apparatus (100) further comprises, in addition to the two tension weights $G_1$ (121) and $G_2$ (122), N additional tension weights $[ZG_1, \ldots, ZG_n, \ldots, ZG_N]$, with $N \geq 1$ and $1 \leq n \leq N$, which are each movably guided in the second guide apparatus (120) in such a way that the connection cable (101) running over the first deflection roller (103) in a (n+2)th displacement region of the N+2 displacement regions of the cable-bound tool (12) is pretensioned by a force generated by a sum of the weights of the tension weights $G_1$ (121), $G_2$ (122) and $ZG_1$ to $ZG_n$.

15. The machine tool (10) according to claim 1, wherein the slide (111) guided in the first guide apparatus (110) is further connected to the machine tool (10) via a restoring elastic element acting in the direction of displacement of the slide (111).

16. The machine tool (10) according to claim 1, wherein the machining apparatus (11) of the machine tool (10) is configured to be moved via three numerically controlled machine axes configured as linear axes.

17. The machine tool (10) according to claim 16, wherein the machine tool (10) further comprises two numerically controlled machine axes which are configured as rotary axes and are orthogonal or inclined to one another and which are configured to orient a machine table (13) configured to support the workpiece opposite the machining apparatus (11).

18. A cable guide apparatus (100) for providing and guiding a flexible connection cable (101), said cable guide apparatus (100) comprising:
- a first guiding apparatus (110),
- a slide (111) movably guided in the first guide apparatus (110),
- a first deflection roller (103) rotatably connected to the slide (111),
- a first tension weight $G_1$ (121),
- a cable pull apparatus (130) connecting the first tension weight $G_1$ (121) to the slide (111) guided in the first guide apparatus (110), wherein the connection cable (101) has a free end and a fixed end connected to a connection apparatus (102) and runs over the first deflection roller (103), wherein, the cable guide apparatus (100) further comprises:
- a second tension weight $G_2$ (122), and
- a second guide apparatus (120) in which the tension weights $G_1$ (121) and $G_2$ (122) are each guided in a movable manner,
- such that the connection cable (101) running over the first deflection roller (103) is pretensioned in a first displacement region of the cable-connected tool (12) by a force generated by the weight of the first tension weight $G_1$ (121) and
- is pretensioned in a second displacement region of the cable-connected tool (12) by a force generated by a sum of the weights of the tension weights $G_1$ (121) and $G_2$ (122).

19. The cable guide apparatus (100) according to claim 18, wherein the cable guide apparatus (100) further comprises one or more successive further deflection apparatus (104), which are each configured to deflect the connection cable (101) which comes from the fixed end on the connection apparatus (102) and runs over the first deflection roller (103).

20. The cable guide apparatus (100) according to claim 18, wherein the cable guide apparatus (100) further comprises, in addition to the two tension weights $G_1$ (121) and $G_2$ (122), N additional tension weights $[ZG_1, \ldots, ZG_n, \ldots, ZG_N]$, with $N \geq 1$ and $1 \leq n \leq N$, which are each movably guided in the second guide apparatus (120) in such a way that the connection cable (101) running over the first deflection roller (103) in a (n+2)th displacement region of the N+2 displacement regions of the cable-bound tool (12) is pretensioned by a force generated by a sum of the weights of the tension weights $G_1$ (121), $G_2$ (122) and $ZG_1$ to $ZG_n$.

* * * * *